(12) United States Patent
Abe et al.

(10) Patent No.: US 12,122,694 B2
(45) Date of Patent: Oct. 22, 2024

(54) ANIONIC FLOCCULANT, ANIONIC FLOCCULANT PRODUCTION METHOD, AND TREATMENT METHOD

(71) Applicant: SUIDO KIKO KAISHA, LTD., Tokyo (JP)

(72) Inventors: Takayuki Abe, Tokyo (JP); Masahiko Ito, Tokyo (JP)

(73) Assignee: SUIDO KIKO KAISHA, LTD., Tokyo (JP)

(*) Notice: Subject to any disclaimer, the term of this patent is extended or adjusted under 35 U.S.C. 154(b) by 716 days.

(21) Appl. No.: 17/279,880

(22) PCT Filed: Sep. 26, 2019

(86) PCT No.: PCT/JP2019/037846
§ 371 (c)(1),
(2) Date: Mar. 25, 2021

(87) PCT Pub. No.: WO2020/067284
PCT Pub. Date: Apr. 2, 2020

(65) Prior Publication Data
US 2021/0340037 A1    Nov. 4, 2021

(30) Foreign Application Priority Data

Sep. 27, 2018  (JP) .................. 2018-181135
Sep. 26, 2019  (JP) .................. 2019-174913

(51) Int. Cl.
*C02F 1/56* (2023.01)
*B01D 21/01* (2006.01)
(Continued)

(52) U.S. Cl.
CPC .............. *C02F 1/56* (2013.01); *B01D 21/01* (2013.01); *C02F 1/5236* (2013.01);
(Continued)

(58) Field of Classification Search
CPC ........ C02F 1/56; C02F 1/5236; C02F 1/5263; C02F 11/143; C02F 11/147;
(Continued)

(56) References Cited

U.S. PATENT DOCUMENTS

| 2005/0118130 A1 | 6/2005 | Utz et al. |
| 2011/0000854 A1 | 1/2011 | Nichols et al. |

(Continued)

FOREIGN PATENT DOCUMENTS

| CN | 105600898 A | 5/2016 |
| CN | 107427745 A | 12/2017 |

(Continued)

OTHER PUBLICATIONS

English language machine translation of JPH0474592A, 2 pages, No Date.*

(Continued)

*Primary Examiner* — Pranav N Patel
(74) *Attorney, Agent, or Firm* — BUCHANAN, INGERSOLL & ROONEY PC (57) ABSTRACT

An anionic flocculant including: galactomannan; and a polysaccharide other than the galactomannan, wherein the anionic flocculant has a bulk density of 0.50 g/cm³ or more but 1.00 g/cm³ or less, the anionic flocculant has a particle diameter $D_{50}$ of 250 μm or more but 850 μm or less, and the anionic flocculant has a particle diameter $D_{10}$ of 150 μm or more.

15 Claims, 3 Drawing Sheets

(51) Int. Cl.
*C02F 1/52* (2023.01)
*C02F 11/143* (2019.01)
*C02F 11/147* (2019.01)
*C02F 103/34* (2006.01)

(52) U.S. Cl.
CPC .......... *C02F 1/5263* (2013.01); *C02F 11/143* (2019.01); *C02F 11/147* (2019.01); *C02F 2103/34* (2013.01)

(58) Field of Classification Search
CPC ...... C02F 2103/34; C02F 1/5272; C02F 1/66; C02F 2101/14; B01D 21/01
See application file for complete search history.

(56) References Cited

U.S. PATENT DOCUMENTS

| | | |
|---|---|---|
| 2014/0124454 A1 | 5/2014 | Nichols et al. |
| 2017/0121187 A1 | 5/2017 | Kimura et al. |
| 2018/0079665 A1 | 3/2018 | Ito et al. |
| 2019/0233313 A1 | 8/2019 | Favero et al. |
| 2019/0359503 A1 | 11/2019 | Ito et al. |

FOREIGN PATENT DOCUMENTS

| | | |
|---|---|---|
| EP | 3156371 A1 | 4/2017 |
| JP | S58-133898 A | 8/1983 |
| JP | H0474592 A | 3/1992 |
| JP | H06-055310 B2 | 7/1994 |
| JP | 2001219005 A | 8/2001 |
| JP | 2002030282 A | 1/2002 |
| JP | 2012532020 A | 12/2012 |
| JP | 2015085219 A | 5/2015 |
| JP | 2015226898 A | 12/2015 |
| JP | 2016502459 A | 1/2016 |
| JP | 2016187782 A | 11/2016 |
| JP | 2018020292 A | 2/2018 |
| JP | 2018047450 A | 3/2018 |
| JP | 2018103185 A | 7/2018 |
| KR | 10-1405360 B1 | 6/2014 |
| KR | 10-2017-0131578 A | 11/2017 |
| WO | 2018/046687 A | 3/2018 |

OTHER PUBLICATIONS

International Search Report (PCT/ISA/210) with an English translation and Written Opinion (PCT/ISA/237) mailed on Nov. 26, 2019, by the Japan Patent Office as the International Searching Authority for International Application No. PCT/JP2019/037846.

Notice of Reasons for Rejection for Japanese Application No. 2018-181135 mailed on Feb. 12, 2019, and an English translation of the Notice. (18 pages).

"What is xanthan gum—thorough explanation about its way of use, properties, structure, effects, etc.", Aug. 31, 2018, Unitec Foods Co., Ltd., with an English translation thereof. (14 pages).

Office Action (Request for the Submission of an Opinion) issued Jun. 16, 2022, by the Korean Intellectual Property Office in corresponding Korean Patent Application No. 10-2021-7008179 and an English translation of the Office Action. (18 pages).

The First Office Action issued Feb. 17, 2022, by the State Intellectual Property Office of People's Republic of China in corresponding Chinese Patent Application No. 201980076306.6 and an English translation of the Office Action. (14 pages).

Extended European Search Report dated May 17, 2022, issued by the European Patent Office in corresponding European Application No. 19866527.5. (7 pages).

* cited by examiner

ANIONIC FLOCCULANT, ANIONIC FLOCCULANT PRODUCTION METHOD, AND TREATMENT METHOD

BACKGROUND ART

The present invention relates to an anionic flocculant, an anionic flocculant production method, and a treatment method.

DESCRIPTION OF THE RELATED ART

Conventionally, wastewater generated from, for example, municipal drainage water, community drainage water for agriculture, and drainage water from plants, and turbid water such as civil engineering-construction turbid water, river water, and pond water include inorganic matters such as mineral matter-type fine particles. A method used for treating such wastewater is a method in which an inorganic flocculant and an organic synthesized polymer flocculant are used alone or in combination to flocculate and separate the inorganic matter in the treatment target water.

In one example of this method, the inorganic flocculant and the organic synthesized polymer flocculant are added to slurry treatment target water to flocculate and precipitate a solid content, and the precipitated flocculated product and supernatant water are separated.

In another example of this method, an inorganic flocculant is added to treatment target water in a flocculation mixing tank, to form fine flocculation flocs (microflocs) into which suspended solids in the treatment target water are incorporated. Next, after the treatment target water containing the microflocs is transferred to a floc formation tank, an organic synthesized polymer flocculant is added to the treatment target water in the floc formation tank, to facilitate formation of the microflocs.

In these methods, for example, polyaluminum chloride (hereinafter, may be referred to as "PAC"), aluminum sulfate, and ferric chloride have generally been used as the inorganic flocculant. As the organic synthesized polymer flocculant, polyacrylamide and a partially hydrolyzed product of polyacrylamide have been used.

However, polyacrylamide-based flocculants are not preferably used in the natural world because of problems such as toxicity of remaining acrylamide monomers. In particular, use of the polyacrylamide-based flocculants is preferably avoided, if possible, in closed water areas (e.g., lakes and marshes) and rivers having an intake of water supply pipe downstream.

Therefore, as one technique for avoiding use of the polyacrylamide-based flocculant, an inorganic flocculation treatment method that uses a water-soluble aluminum salt and a polysaccharide in combination has been proposed (see, for example, PTL 1).

However, in the disclosed technique, a degree that the polysaccharide increases a viscosity of the treatment target water is smaller than a degree that the polyacrylamide-based flocculant increases a viscosity of the treatment target water, and the polysaccharide cannot be expected for such a flocculation effect that is comparable to the effect exhibited by the polyacrylamide-based flocculant.

Such a technique that a polyacrylamide-based flocculant and a sub-polymer flocculant are used in combination to set a rate of acrylamide contained in the whole composition to 0.05% by mass or less has been proposed (see, for example, PTL 2). In the proposed technique, the rate of acrylamide contained in the whole composition is set to 0.05% by mass or less. However, the rate of acrylamide contained is not completely 0% because the composition includes the polyacrylamide-based flocculant.

Therefore, there is a demand for a flocculant that is easily handled and has an excellent flocculation performance even when the polyacrylamide-based flocculant is not used, and a treatment method using the flocculant.

CITATION LIST

Patent Literature

PTL 1 Japanese Patent Application Laid-Open No. 2015-226898

PTL 2 Japanese Patent Application Laid-Open No. 2018-20292

SUMMARY OF INVENTION

Technical Problem

The present invention is proposed considering these conventional actual circumstances, and an object of the present invention is to provide an anionic flocculant that is easily handled and has an excellent flocculation performance even when the polyacrylamide-based flocculant is not used, a production method of the anionic flocculant, and a treatment method using the anionic flocculant.

Solution to Problem

Means for solving the aforementioned problems are as follows, for example.

<1> An anionic flocculant including:
galactomannan; and
a polysaccharide other than the galactomannan,
wherein the anionic flocculant has a bulk density of 0.50 g/cm$^3$ or more but 1.00 g/cm$^3$ or less,
the anionic flocculant has a particle diameter $D_{50}$ of 250 μm or more but 850 μm or less, and
the anionic flocculant has a particle diameter $D_{10}$ of 150 μm or more.

<2> The anionic flocculant according to <1>,
wherein the galactomannan is derived from a natural product, and
the polysaccharide is derived from a natural product.

<3> The anionic flocculant according to <1> or <2>,
wherein the galactomannan includes at least one selected from the group consisting of fenugreek gum, guar gum, tara gum, and locust bean gum.

<4> The anionic flocculant according to any one of <1> to <3>,
wherein the polysaccharide includes at least one selected from the group consisting of xanthan gum, carrageenan, and carboxymethyl cellulose.

<5> The anionic flocculant according to any one of <1> to <4>,
wherein a mass ratio (galactomannan:polysaccharide) between the galactomannan and the polysaccharide is from 0.1:99.9 through 99.9:0.1.

<6> The anionic flocculant according to any one of <1> to <5>,
wherein an aqueous solution obtained by dissolving 0.2 parts by mass of the anionic flocculant in 100 parts by mass of pure water has a viscosity of 10 mPa·s or more.

<7> The anionic flocculant according to any one of <1> to <6>,
wherein the viscosity of the aqueous solution obtained by dissolving 0.2 parts by mass of the anionic flocculant in 100 parts by mass of pure water is higher than a viscosity of an aqueous solution obtained by dissolving 0.2 parts by mass of the galactomannan in 100 parts by mass of pure water and a viscosity of an aqueous solution obtained by dissolving 0.2 parts by mass of the polysaccharide in 100 parts by mass of pure water.
<8> The anionic flocculant according to any one of <1> to <7>,
wherein the anionic flocculant is a water purification agent.
<9> The anionic flocculant according to any one of <1> to <7>,
wherein the anionic flocculant is a thickener of sludge.
<10> A method for producing the anionic flocculant according to any one of <1> to <8>, the method including:
kneading the galactomannan, the polysaccharide, and water to obtain a kneaded product;
subjecting the kneaded product to extrusion granulation or agitation granulation to perform granulation, to obtain a granulated product;
drying the granulated product to obtain a dried product;
disintegrating the dried product to obtain a disintegrated product; and
classifying the disintegrated product.
<11> A treatment method including:
adding the anionic flocculant according to any one of <1> to <8> to a treatment target matter, to treat the treatment target matter.
<12> The treatment method according to <11>, further including:
adding, to the treatment target matter, at least one selected from the group consisting of an inorganic flocculant and a cationic flocculant.
<13> The treatment method according to <12>,
wherein the inorganic flocculant includes at least one selected from the group consisting of iron(II) chloride, iron(III) chloride, iron(II) sulfate, iron(III) sulfate, polyiron(III) sulfate, polysilica iron, iron(II) nitrate, iron(III) nitrate, and slaked lime.
<14> The treatment method according to <12>,
wherein the cationic flocculant includes at least one selected from the group consisting of chitosan, oligo glucosamine, cationized starch, cationized cellulose, and cationized guar gum.
<15> The treatment method according to any one of <11> to <14>,
wherein the treatment target matter is drainage water to be cleaned in a filtration pool for a water purification treatment; sludge; or treatment target water including drainage water from plants.

Advantageous Effects of Invention

According to the present invention, it is possible to provide an anionic flocculant that is easily handled and has an excellent flocculation performance even when the polyacrylamide-based flocculant is not used, a production method of the anionic flocculant, and a treatment method using the anionic flocculant.

DESCRIPTION OF EMBODIMENTS (Anionic Flocculant)
An anionic flocculant of the present invention includes at least galactomannan and a polysaccharide other than the galactomannan, and further includes other components if necessary.
The anionic flocculant is a mixture containing the galactomannan and the polysaccharide.
The anionic flocculant is particles of the mixture.
<Galactomannan>
The galactomannan is a polysaccharide formed by binding galactose [α-D-galactopyranose] to a linear main chain [β-(1-4)-D-mannopyranose] of mannose via the α-(1-6)-bond.
Examples of the galactomannan include fenugreek gum, guar gum, sesbania gum, tara gum, locust bean gum, and cassia gum. Among them, fenugreek gum, guar gum, tara gum, and locust bean gum are preferable.
These may be used alone in combination.
The galactomannan is generally derived from a natural product.
The fenugreek gum is galactomannan derived from a fenugreek seed.
The guar gum is galactomannan derived from a guar bean seed.
The sesbania gum is galactomannan derived from a sesbania seed.
The tara gum is galactomannan derived from a tara seed.
The locust bean gum is galactomannan derived from a locust bean seed.
The cassia gum is galactomannan derived from a *Cassia obtusifolia* seed.
A molecular weight of the galactomannan is not particularly limited and may be appropriately selected depending on the intended purpose.
A molar ratio (mannose:galactose) between mannose and galactose as constitutional components in the galactomannan is not particularly limited and may be appropriately selected depending on the intended purpose. The molar ratio is preferably from 4.5:1 through 1:1, more preferably from 4:1 through 2:1.
Examples of molar ratios in various galactomannans are described below.
Fenugreek gum
mannose:galactose=1:1 (molar ratio)
Guar gum
mannose:galactose=2:1 (molar ratio)
Tara gum
mannose:galactose=3:1 (molar ratio)
Locust bean gum
mannose:galactose=4:1 (molar ratio)
Cassia gum
mannose:galactose=5:1 (molar ratio)
<Polysaccharide>
The polysaccharide other than the galactomannan is not particularly limited and may be appropriately selected depending on the intended purpose. Examples thereof include xanthan gum, carrageenan, and carboxymethyl cellulose.

The polysaccharide is generally derived from a natural product.

The xanthan gum is formed of a recurring unit of two molecules of glucose, two molecules of mannose, and glucuronic acid. The xanthan gum also includes a potassium salt, a sodium salt, and a calcium salt. The xanthan gum is generally formed by fermenting starch such as corn by bacteria *Xanthomonas campestris*.

The carrageenan is a kind of a straight-chain sulfur-containing polysaccharide and is an anionic polymer compound constituted by D-galactose (or 3,6-anhydro-D-galactose) and sulfuric acid. The carrageenan can generally be obtained by extracting red algae with alkali.

A molecular weight of the polysaccharide is not particularly limited and may be appropriately selected depending on the intended purpose.

A mass ratio (galactomannan:polysaccharide) between the galactomannan and the polysaccharide in the anionic flocculant is not particularly limited and may be appropriately selected depending on the intended purpose. The mass ratio is preferably from 0.1:99.9 through 99.9:0.1, more preferably from 0.5:99.5 through 99.5:0.5, still more preferably from 1:99 through 99:1, particularly preferably from 10:90 through 90:10.

In the anionic flocculant, in order to obtain an excellent flocculation performance, an aqueous solution obtained by dissolving 0.2 parts by mass of the anionic flocculant in 100 parts by mass of pure water preferably has a viscosity of 10 mPa·s or more, more preferably has a viscosity of 100 mPa·s or more, still more preferably has a viscosity of from 200 mPa·s through 1,100 mPa·s, particularly preferably has a viscosity of from 300 mPa·s through 800 mPa·s.

Here, the viscosity in the present invention is a viscosity measured using a B-type viscometer (Brookfield rotational viscometer) (speed of revolution: 30 rpm) at 25° C.

In the anionic flocculant, in order to obtain an excellent flocculation performance, a viscosity (A) of the aqueous solution obtained by dissolving 0.2 parts by mass of the anionic flocculant in 100 parts by mass of pure water is preferably higher than a viscosity (X) of an aqueous solution obtained by dissolving 0.2 parts by mass of the galactomannan in 100 parts by mass of pure water and a viscosity (Y) of an aqueous solution obtained by dissolving 0.2 parts by mass of the polysaccharide in 100 parts by mass of pure water.

In the anionic flocculant, in order to obtain an excellent flocculation performance, the viscosity (A) of the aqueous solution obtained by dissolving 0.2 parts by mass of the anionic flocculant in 100 parts by mass of pure water is preferably two times or more, more preferably 10 times or more, particularly preferably 20 times or more as high as the viscosity (X) of the aqueous solution obtained by dissolving 0.2 parts by mass of the galactomannan in 100 parts by mass of pure water. An upper limit of the ratio [viscosity (A)/viscosity (X)] of the viscosity (A) to the viscosity (X) is not particularly limited and may be appropriately selected depending on the intended purpose. For example, the upper limit thereof is 10 times or less.

In the anionic flocculant, in order to obtain an excellent flocculation performance, the viscosity (A) of the aqueous solution obtained by dissolving 0.2 parts by mass of the anionic flocculant in 100 parts by mass of pure water is preferably 1.5 times or more, more preferably 2 times or more as high as the viscosity (Y) of the aqueous solution obtained by dissolving 0.2 parts by mass of the polysaccharide in 100 parts by mass of pure water. An upper limit of the ratio [viscosity (A)/viscosity (Y)] of the viscosity (A) to the viscosity (Y) is not particularly limited and may be appropriately selected depending on the intended purpose. For example, the upper limit thereof is 10 times or less.

<Bulk Density>

A bulk density of the anionic flocculant is 0.50 g/cm$^3$ or more but 1.00 g/cm$^3$ or less, preferably 0.60 g/cm$^3$ or more but 0.90 g/cm$^3$ or less.

In the case where the bulk density is less than 0.50 g/cm$^3$, when the anionic flocculant is added to a water-containing treatment target matter, the anionic flocculant easily floats, to deteriorate dispersibility. As a result, flocs of the anionic flocculant are formed in the treatment target matter, and handling becomes difficult.

When the bulk density is more than 1.00 g/cm$^3$, when the anionic flocculant is added to a water-containing treatment target matter, the anionic flocculant sinks, to deteriorate dispersibility. As a result, flocs of the anionic flocculant are formed in the treatment target matter, and handling becomes difficult.

The term "floc" refers to a part solidified as powder, which is formed when the powder is mixed with, for example, water and is not sufficiently dispersed therein. The term "floc" is called "mamako" or "dama" in Japanese.

The bulk density is a loose bulk density.

The bulk density can be measured using an apparatus for evaluating powder characteristics (available from HOSOKAWA MICRON CORPORATION, powder tester PT-X). The measurement is performed according to the specification of the apparatus.

<Particle Diameter $D_{50}$>

A particle diameter $D_{50}$ of the anionic flocculant is 250 μm or more but 850 μm or less, preferably 300 μm or more but 800 μm or less.

In the case where the particle diameter $D_{50}$ is less than 250 μm, when the anionic flocculant is added to a water-containing treatment target matter, the anionic flocculant easily floats, to deteriorate dispersibility. As a result, flocs of the anionic flocculant are formed in the treatment target matter, and handling becomes difficult.

When the particle diameter $D_{50}$ is more than 850 μm, fluidity of the flocculant becomes worse, and bridge or rat-hole easily occurs in a hopper. As the particle diameter is larger, a longer time to dissolve the flocculant in water is required.

The particle diameter $D_{50}$ is a median diameter, and refers to a particle diameter at which the cumulative frequency is 50%.

<Particle Diameter $D_{10}$>

A particle diameter $D_{10}$ of the anionic flocculant is 150 μm or more, preferably 200 μm or more.

When the particle diameter $D_{10}$ is less than 150 μm, fine powder is increased. In addition, when the anionic flocculant is added to a water-containing treatment target matter, the anionic flocculant easily floats, to deteriorate dispersibility. As a result, flocs of the anionic flocculant are formed in the treatment target matter, and handling becomes difficult.

The particle diameter $D_{10}$ refers to a particle diameter at which the cumulative frequency is 10%.

Generally, the particle diameter $D_{10}$ is smaller than the particle diameter $D_{50}$. A difference ($D_{50}$-$D_{10}$) between the particle diameter $D_{50}$ and the particle diameter $D_{10}$ is not particularly limited and may be appropriately selected depending on the intended purpose. The difference ($D_{50}$-$D_{10}$) is preferably 50 μm or more but 300 μm or less, more preferably 100 μm or more but 200 μm or less.

The particle diameter $D_{50}$ and the particle diameter $D_{10}$ can be measured using a scattering particle diameter distribution measurement apparatus (available from HORIBA, laser diffraction/scattering particle diameter distribution measurement apparatus LA-950V2+dry measurement unit). The measurement is performed according to the specification of the apparatus.

The anionic flocculant is, for example, a water purification agent used for water purification.

The anionic flocculant is, for example, a thickener of sludge used for dewatering and thickening sludge.

(Production Method of Anionic Flocculant)

A method of the present invention for producing an anionic flocculant is a method for producing the anionic flocculant of the present invention.

The method for producing the anionic flocculant includes at least a kneaded product producing step, a granulation step, a drying step, a disintegration step, and a classification step, and further includes other steps if necessary.

<Kneaded Product Producing Step>

The kneaded product producing step is not particularly limited and may be appropriately selected depending on the intended purpose, so long as it is a step of kneading the galactomannan, the polysaccharide (a polysaccharide other than the galactomannan), and water to obtain a kneaded product.

In the kneaded product producing step, the galactomannan, the polysaccharide (a polysaccharide other than the galactomannan), and water are mixed at one time to obtain a mixture, and the mixture may be kneaded to obtain a kneaded product.

In the kneaded product producing step, after the galactomannan and the polysaccharide are mixed to obtain a mixture, water is added to the mixture, and then the mixture to which water is added may be kneaded to obtain a kneaded product.

As the kneaded product producing step, it is preferable to use a method where, after the galactomannan and the polysaccharide are mixed to obtain a mixture, water is added to the mixture, and then the mixture to which water is added is kneaded to obtain a kneaded product. The reason for this is because a granulated product having desired particle diameter and bulk density can be obtained.

In the kneaded product producing step, an amount of water relative to the total amount of the galactomannan and the polysaccharide is not particularly limited and may be appropriately selected depending on the intended purpose. The amount thereof is preferably 5% by mass or more but 250% by mass or less, more preferably 10% by mass or more but 100% by mass or less, particularly preferably 10% by mass or more but 60% by mass or less. The amount falling within the particularly preferable range is advantageous because the particle diameter and the bulk density can be easily adjusted.

<Granulation Step>

The granulation step is not particularly limited and may be appropriately selected depending on the intended purpose, so long as it is a step of subjecting the kneaded product to extrusion granulation or agitation granulation to perform granulation, to obtain a granulated product.

Examples of the granulation method of the kneaded product include the extrusion granulation method, the agitation granulation method, and the sheet-type granulation method. When a mixture containing the galactomannan and the polysaccharide is granulated, the extrusion granulation method or the agitation granulation method achieves a higher yield rate and a higher productivity than the sheet-type granulation method. Specifically, the extrusion granulation method or the agitation granulation method generates less loss at the time of classification compared to the sheet-type granulation method. Moreover, the extrusion granulation method generates less loss at the time of classification, and achieves a higher productivity than the agitation granulation method.

The extrusion granulation is a granulation method in which a wet block of the kneaded product is extruded in the form of a circular column from a small pore.

The agitation granulation is a granulation method in which the kneaded product is charged into a container, and a bonding agent of liquid is added thereto upon stirring to flocculate particles.

The sheet-type granulation method, which is a kind of dry granulation, is a granulation method in which powder is crushed between two rollers to form a raw material into a sheet, followed by pulverizing it.

For example, the water content in the kneaded product producing step and the granulation conditions in the granulation step can be appropriately adjusted to adjust the produced anionic flocculant so as to have a desired bulk density.

<Drying Step>

The drying step is not particularly limited and may be appropriately selected depending on the intended purpose, so long as it is a step of drying the granulated product to obtain a dried product.

The water content in the dried product is not particularly limited and may be appropriately selected depending on the intended purpose, but is preferably 15% by mass or less.

The drying step can be performed by, for example, a vibration fluidized-bed dryer or a hot air dryer.

The drying step makes it easy to perform disintegration in the subsequent disintegration step, which achieves a high productivity.

<Disintegration Step>

The disintegration step is not particularly limited and may be appropriately selected depending on the intended purpose, so long as it is a step of disintegrating the dried product to obtain a disintegrated product.

The disintegration step can be performed by, for example, a crusher.

Examples of the crusher include compression crushers, shearing crushers, impact crushers, ball medium crushers, and airflow crushers.

<Classification Step>

The classification step is not particularly limited and may be appropriately selected depending on the intended purpose, so long as it is a step of classifying the disintegrated product.

The classification step can be performed through sieving with a sieve, or by a gravitational classifier, a centrifugal classifier (cyclone-type classifier), or an inertial classifier.

For example, when the disintegration conditions of the disintegration step and the classification conditions of the classification step are appropriately adjusted, the anionic flocculant to be produced can be adjusted so as to have desired particle diameter and particle size distribution.

(Treatment Method)

A treatment method of the present invention is a method in which the anionic flocculant of the present invention is added to a treatment target matter to treat the treatment target matter.

Examples of the treatment include a water purification treatment and a thickening treatment of sludge.

The treatment method is preferably a treatment method in which at least one selected from the group consisting of an inorganic flocculant and a cationic flocculant is further added to the treatment target matter.

Combination of the anionic flocculant and the inorganic flocculant can increase a viscosity of the treatment target matter that contains water compared to use of the anionic flocculant alone. As a result, an effect of flocculation is enhanced, and effects of treatments such as the water purification treatment and the thickening treatment of sludge become high.

Combination of the anionic flocculant and the cationic flocculant can increase a viscosity of the treatment target matter that contains water compared to use of the anionic flocculant alone. As a result, an effect of flocculation is enhanced, and effects of treatments such as the water purification treatment and the thickening treatment of sludge become high.

The treatment method may be a treatment method in which the anionic flocculant and at least one selected from the group consisting of the inorganic flocculant and the cationic flocculant are added to the treatment target matter at the same time.

The treatment method may be a treatment method in which the anionic flocculant is added to the treatment target matter, and then at least one selected from the group consisting of the inorganic flocculant and the cationic flocculant is added to the treatment target matter.

The treatment method may be a treatment method in which at least one selected from the group consisting of the inorganic flocculant and the cationic flocculant is added to the treatment target matter, and then the anionic flocculant is added to the treatment target matter.

Among them, it is preferable to use a treatment method in which at least one selected from the group consisting of the inorganic flocculant and the cationic flocculant is added to the treatment target matter, and then the anionic flocculant is added to the treatment target matter. The reason for this is as follows. Generally, the surfaces of suspended particles are negatively charged. Therefore, when the cationic flocculant is added thereto, to bind the suspended particles. After that, the anionic flocculant is added thereto, to form large flocs by a cross-linking effect.

The inorganic flocculant is not particularly limited and may be appropriately selected depending on the intended purpose. Examples of the inorganic flocculant include aluminum-based inorganic flocculants, iron-based inorganic flocculants, and slaked lime.

Examples of the aluminum-based inorganic flocculant include the polyaluminum chloride (PAC) and aluminum sulfate.

Examples of the iron-based inorganic flocculant include iron(II) chloride, iron(III) chloride, iron(II) sulfate, iron(III) sulfate, polyiron(III) sulfate, polysilica iron, iron(II) nitrate, and iron(III) nitrate.

These may be used alone or in combination.

The cationic flocculant is not particularly limited and may be appropriately selected depending on the intended purpose. Examples of the cationic flocculant include cationic polysaccharides and cationic organic flocculants other than the cationic polysaccharides.

Examples of the cationic polysaccharide include chitosan, oligo glucosamine (chitosan oligosaccharide), cationized starch, cationized cellulose, and cationized guar gum.

Examples of the cationic organic flocculant include polyacrylic ester, polymethacrylic acid ester, polyvinyl amidine, and polydiallyldimethylammonium chloride.

These may be used alone or in combination.

An amount of the anionic flocculant used in the treatment method is not particularly limited and may be appropriately selected depending on the intended purpose. For example, the amount thereof may be 0.01 mg or more but 50 mg or less, or may be 0.05 mg or more but 20 mg or less, relative to 1 L of the treatment target matter.

An amount of the inorganic flocculant used in the treatment method is not particularly limited and may be appropriately selected depending on the intended purpose. For example, the amount thereof may be 1 mg or more but 200 mg or less, or may be 10 mg or more but 50 mg or less, relative to 1 L of the treatment target matter.

An amount of the cationic flocculant used in the treatment method is not particularly limited and may be appropriately selected depending on the intended purpose. For example, the amount thereof may be 1 mg or more but 500 mg or less, or may be 10 mg or more but 50 mg or less, relative to 1 L of the treatment target matter.

When the anionic flocculant (A) and at least one (B) selected from the group consisting of the inorganic flocculant and the cationic flocculant are used in the treatment method, a mass ratio [(A)/(B)] between the anionic flocculant (A) and at least one (B) selected from the group consisting of the inorganic flocculant and the cationic flocculant used in the treatment method is not particularly limited and may be appropriately selected depending on the intended purpose. The mass ratio [(A)/(B)] may be 0.005 or more but 10 or less, may be 0.05 or more but 1 or less, or may be 0.1 or more but 0.5 or less.

In the treatment method, for example, the treatment target matter is treatment target water, and the anionic flocculant is added to the treatment target water to purify the treatment target water. The treatment method can be used in water treatment for various purposes such as service water for plants and waterworks.

In the treatment method, for example, the treatment target matter is drainage water to be cleaned in a filtration pool of a water purification treatment, and the anionic flocculant is added to the drainage water to be cleaned to purify the drainage water to be cleaned.

In the treatment method, for example, the treatment target matter is sludge, and the anionic flocculant is added to the sludge, to dewater and thicken the sludge.

In the treatment method, for example, the treatment target matter is treatment target water including drainage water from plants, and the anionic flocculant is added to the treatment target water to remove contaminant substances from the treatment target water.

Examples of the contaminant substance include fluorine, suspended solids (SS), heavy metals, cyanogen, and phosphorus.

A water purification treatment facility used in the treatment method is not particularly limited and may be appropriately selected depending on the intended purpose. Examples of the water purification treatment facility include water purification facilities including a horizontal precipitation facility and water purification facilities with a high-speed flocculation precipitation facility.

Examples of the high-speed flocculation precipitation facility include slurry circulation-type facilities and sludge-blanket type facilities.

The drainage water treatment facility of a water purification plant used in the treatment method is not particularly limited and may be appropriately selected depending on the intended purpose. Examples thereof include gravitationally thickening facilities, mechanically dewatering facilities, and air drying bed facilities.

Hereinafter, one example of the treatment method of the present invention will be described with reference to the drawings.

Figure 1:
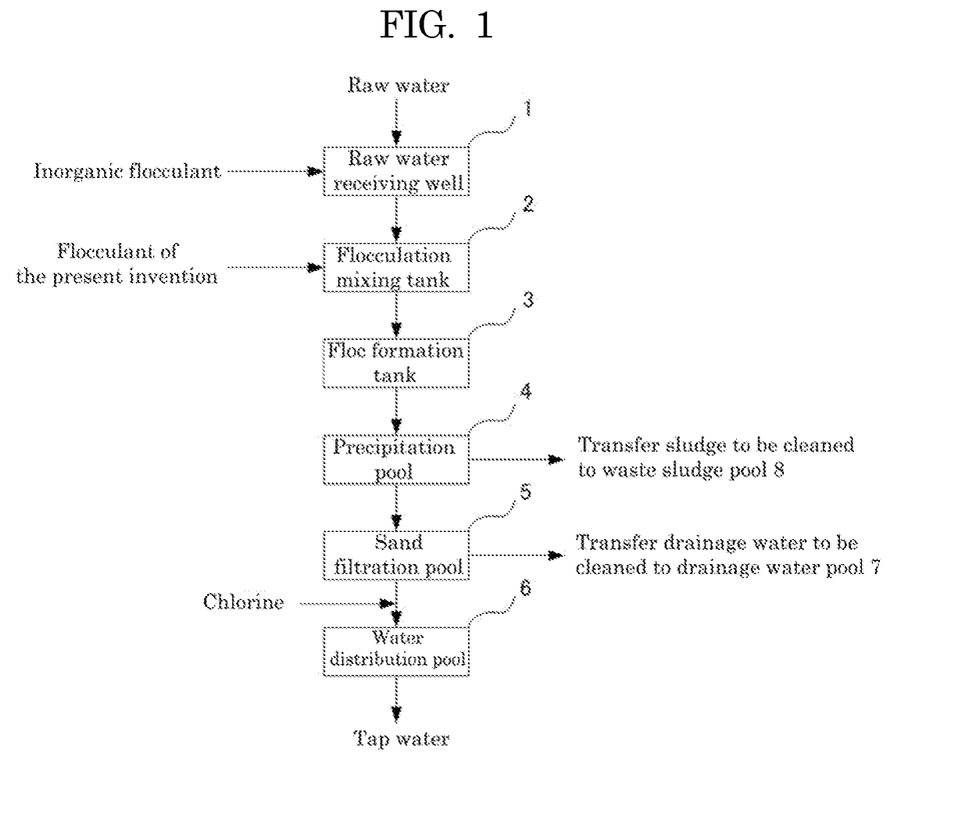
FIG. 1 is a view for presenting one example of a water purification treatment according to the present invention.

FIG. 1 is a flow chart presenting, as one example, a water purification facility including a horizontal precipitation facility.

Raw water (treatment target water) containing suspended solids passes through a raw water introduction pipe, and, if necessary, is transferred to a flocculation mixing tank 2 (mixing pool) via a raw water receiving well 1 (raw water receiving pool). An inorganic flocculant such as aluminum sulfate or polyaluminum chloride (PAC) or a cationic flocculant such as chitosan or cationized starch is injected into the flocculation mixing pool 2. The rapid agitation can form fine flocculation flocs (microflocs) that incorporate the suspended solids in the raw water. An amount of the inorganic flocculant injected, which is different depending on water quality of the raw water, falls within, for example, the range of from 10 mg/liter through 500 mg/liter.

Then, the raw water containing the microflocs is slowly agitated in a floc formation tank 3 (formation pool), and the microflocs in the raw water further grow. At this time, before or after the raw water containing the microflocs flows into the floc formation tank 3, the anionic flocculant of the present invention is added to the raw water containing the microflocs. An amount of the anionic flocculant added is not particularly limited and may be appropriately selected depending on the intended purpose. The amount thereof is, for example, the range of from 0.01 mg through 20 mg or the range of from 0.05 mg through 10 mg relative to 1 liter of the raw water.

While the anionic flocculant is added thereto or after the anionic flocculant is added thereto, the slow agitation is performed, to allow the flocs to grow. An agitation speed (number of revolutions) of the slow agitation is set so that a G value (a square root of a value obtained by dividing the work P per the unit time unit volume by a coefficient of viscosity μ of the treatment target water, JAPAN WATER WORKS ASSOCIATION, Design Criteria for Water Supply Facilities 2000, P188) is lower energy than that of the rapid agitation obtained when the inorganic flocculant is added. As a result, the flocs are allowed to grow.

The growth of the flocs improves a solid-liquid separation property in a precipitation pool 4. In addition, the growth of the flocs decreases the suspended solids (hereinafter, may be referred to as SS) or the turbidity in flocculation precipitation treatment water because the fine flocs are also incorporated into the flocs that have grown. As a result, the load applied on a later filtration treatment is decreased.

After the flocs have grown, the raw water is transferred to the precipitation pool 4, and the grown flocculated flocs are precipitated and separated by gravity. The flocculation precipitation treatment water from which the suspended solids have been removed are allowed to pass to a sand filtration pool 5, to remove the turbidity or the fine flocs. A filter material of the sand filtration pool 5 is not particularly limited. The most general filter materials are, for example, silica sand and anthracite. There are some cases such as a case where only silica sand is used and a case of a dual-layer filtration where silica sand and anthracite are used for filter materials.

When the resultant is transferred to a water distribution pool 6 from the sand filtration pool 5, chlorine is added thereto. In the water distribution pool 6, the resultant is sterilized with chlorine, and the treatment target water that goes out of the water distribution pool 6 is used as tap water.

Figure 2:
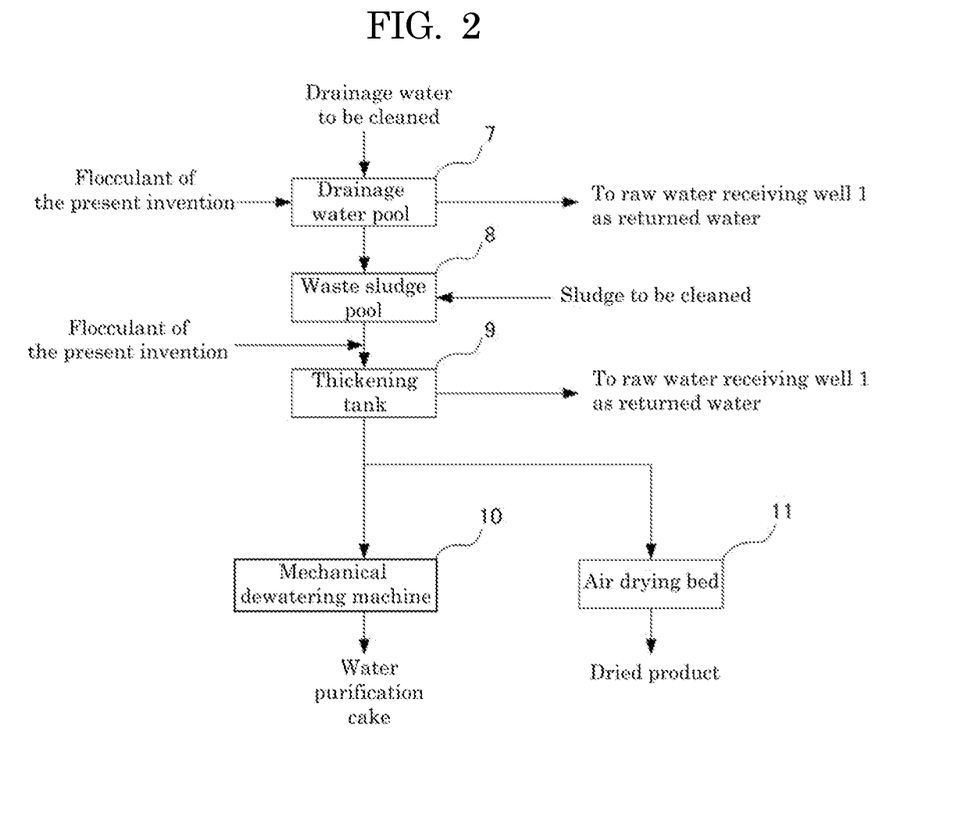
FIG. 2 is a view for presenting one example of treating drainage water and sludge according to the present invention.

FIG. 2 is a flow in which drainage water to be cleaned in the sand filtration pool or the water purification sludge generated in the flocculation precipitation treatment in FIG. 1 is treated.

The drainage water to be cleaned in the sand filtration pool 5 is subjected to solid-liquid separation in a drainage water pool 7. The sludge part is transferred to a waste sludge pool 8, and overflow water as returned water is returned to the raw water receiving well 1 of the aforementioned water purification facility. The water purification sludge generated in the precipitation pool 4 of the aforementioned water purification facility or in a flocculation precipitation treatment in another facility is thickened in a thickening tank 9 via the waste sludge pool 8. The thickened water purification sludge is dewatered. The overflow water in the thickening tank 9 as the returned water is returned to the raw water receiving well 1.

As described above, the drainage water-treated water that has been treated in the drainage water pool 7 or the thickening tank 9 is returned to the raw water receiving well 1 into which raw water of water supply in water purification facilities flows, and is changed into a raw material for tap water or service water. On the other hand, the water component contained in a solid matter (sludge) generated in the drainage water treatment is removed by a mechanical dewatering machine 10 or an air drying bed 11. The obtained dewatered cake or dried product can be effectively used as, for example, soil improvement materials. In the mechanical dewatering, non-chemical injection without injecting chemicals is commonly used, and a pressure-dewatering-type (filter press-type) dewatering equipment is mainly used.

In FIG. 2, before or after the drainage water to be cleaned in the sand filtration pool 5 flows into the drainage water pool 7, the anionic flocculant of the present invention is added to the drainage water to be cleaned. Addition of the anionic flocculant facilitates flocculation of suspended solids (SS) in the drainage water to be cleaned, which improves a solid-liquid separation property in the drainage water pool 7, decreases a concentration of the SS in the overflow water from the drainage water pool 7 (i.e., the returned water), and decreases the SS load caused by the returned water. Therefore, in a flocculation step of a return place (water purification facility), the inorganic flocculant can be decreased, and a solid-liquid separation property in the precipitation pool 4 is also improved.

The sludge that has removed mud in the precipitation pool 4 generally has a low concentration of the solid content. Therefore, the anionic flocculant of the present invention may be added to the sludge to be cleaned before the sludge to be cleaned flows into thickening tank 9, to thicken the sludge to be cleaned. Examples of a thickening method in the thickening tank 9 include gravitational thickening and belt thickening.

Figure 3:
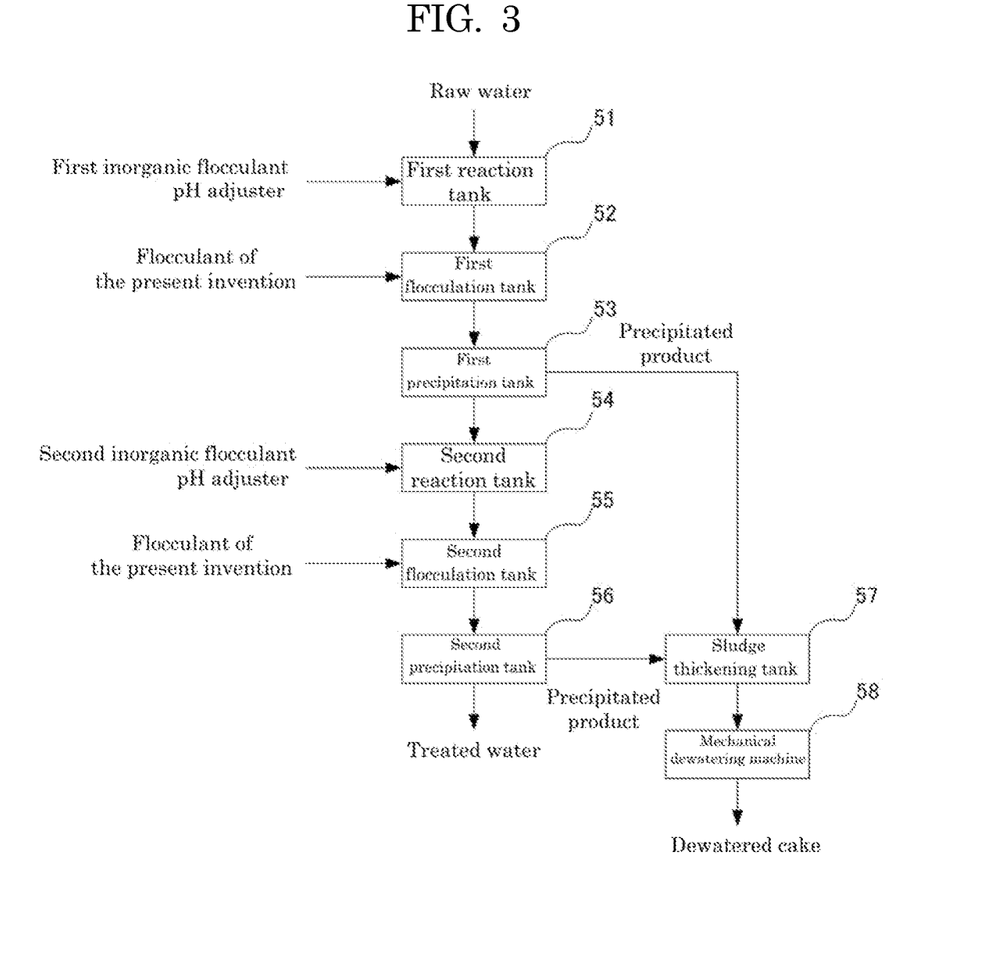
FIG. 3 is a view for presenting one example of treating drainage water from plants according to the present invention.

FIG. 3 presents a flow of a treatment example of fluorine of drainage water from plants, which contains fluorine as a contaminant substance. The following treatment example is a high-grade treatment method in which calcium and aluminum are used in combination. In the case of a treatment using calcium alone, it is difficult to adjust a concentration of fluorine to 8 ppm or less. However, the following high-grade treatment method can adjust the concentration of fluorine to 1 ppm or less.

First, raw water (drainage water from plants, which contains fluorine) is charged into a first reaction tank 51. Then, the first reaction tank 51 is charged with a first inorganic flocculant [e.g., $Ca(OH)_2$, $CaCl_2$] that reacts with fluorine and a pH adjuster (e.g., sulfuric acid, sodium hydroxide) to adjust the pH, followed by agitating. As a result, an inorganic salt of fluorine (e.g., calcium fluoride) is precipitated. The resultant is transferred to a first flocculation tank 52, and the anionic flocculant of the present invention is charged into the first flocculation tank 52. Then, agitation is performed to flocculate the precipitated product of the inorganic salt of fluorine. Next, the raw water containing the flocculated product is transferred to a first precipitation tank 53 and is left to stand. The generated flocculated product is precipitated in the first precipitation tank 53.

The supernatant in the first precipitation tank 53 is transferred to a second reaction tank 54. Then, the second reaction tank 54 is charged with a second inorganic flocculant [e.g., PAC, aluminum sulfate] that reacts with the remaining fluorine and a pH adjuster (e.g., calcium hydroxide, sodium hydroxide) to adjust the pH, followed by agitating. As a result, an inorganic salt of fluorine (e.g., $AlF_3$) is precipitated. It is transferred to a second flocculation tank 55, and the anionic flocculant of the present invention is charged into the second flocculation tank 55. Then, agitation is performed to flocculate the precipitated product of the inorganic salt of fluorine. Next, the raw water containing the flocculated product is transferred to a second precipitation tank 56 and is left to stand. The generated flocculated product is precipitated in the second precipitation tank 56.

The supernatant in the second precipitation tank 56 is a treated water.

Meanwhile, the precipitated products in the first precipitation tank 53 and the second precipitation tank 56 are transferred to a sludge thickening tank 57, and are thickened by a thickening method such as gravitational thickening or belt thickening. The thickened product is transferred to a mechanical dewatering machine 58 such as a pressure-dewatering-type (filter press-type) dewatering equipment and is dewatered, to form a dewatered cake.

EXAMPLES

Examples of the present invention will be described hereinafter, but the present invention should not be construed as being limited to these Examples.

Example 1

First, galactomannan (guar gum, product name: GRINDSTED GUAR 175, obtained from Danisco) (80 parts by mass), another polysaccharide (xanthan gum, product name: KELZAN, available from CP Kelco) (20 parts by mass), and water (40 parts by mass) were kneaded, and the kneaded product was subjected to extrusion granulation (number of revolutions: 30 rpm and screen diameter φ: 0.8 mm) using an extrusion granulator. The resultant was dried (120° C., 30 minutes) using a dryer, was disintegrated (1,000 rpm and screen diameter φ: 5 mm) using a disintegration machine, and was classified (sieve aperture: 850 μm) using a classifier, to obtain an anionic flocculant.

As the extrusion granulator, a basket-type wet granulator (obtained from KIKUSUI SEISAKUSHO LTD.) was used.

As the dryer, a conveyer-type dryer (obtained from GODAI ENGINEERING CO., LTD.) was used.

As the disintegration machine, an orient mill (obtained from Orient Kikai Co.) was used.

As the classifier, an oscillating-type classifier (obtained from DALTON CORPORATION) was used.

<Bulk Density>

The bulk density (loose bulk density) of the produced anionic flocculant was measured in the following manner.

The measurement sample was quietly charged into a cup (100 cc) made of stainless steel, and was measured using an apparatus for evaluating powder characteristics (obtained from HOSOKAWA MICRON CORPORATION, powder tester PT-X). The measurement was performed according to the specification of the apparatus.

<Particle Diameters ($D_{50}$) and ($D_{10}$)>

The particle diameter $D_{50}$ and the particle diameter $D_{10}$ were measured using a scattering particle diameter distribution measurement apparatus (obtained from HORIBA, laser diffraction/scattering particle diameter distribution measurement apparatus LA-950V2+dry measurement unit). The measurement was performed according to the specification of the apparatus.

Examples 2 to 8

An anionic flocculant was obtained in the same manner as in Example 1 except that galactomannan and another polysaccharide were changed to materials and amounts (parts by mass) presented in Table 1.

The obtained anionic flocculants were measured for the bulk density and the particle diameters ($D_{50}$ and $D_{10}$) in the same manner as in Example 1. Results are presented in Table 1.

Example 9

An anionic flocculant was obtained in the same manner as in Example 2 except that the number of revolutions of the extrusion granulator was changed to 25 rpm.

The obtained anionic flocculant was measured for the bulk density and the particle diameters ($D_{50}$ and $D_{10}$) in the same manner as in Example 1. Results are presented in Table 2.

Example 10

An anionic flocculant was obtained in the same manner as in Example 2 except that the number of revolutions of the extrusion granulator was changed to 35 rpm.

The obtained anionic flocculant was measured for the bulk density and the particle diameters ($D_{50}$ and $D_{10}$) in the same manner as in Example 1. Results are presented in Table 2.

Example 11

An anionic flocculant was obtained in the same manner as in Example 2 except that the sieve aperture of the classifier was changed to 425 μm.

The obtained anionic flocculant was measured for the bulk density and the particle diameters ($D_{50}$ and $D_{10}$) in the same manner as in Example 1. Results are presented in Table 2.

Example 12

An anionic flocculant was obtained in the same manner as in Example 2 except that the sieve aperture of the classifier was changed to 1 mm.

The obtained anionic flocculant was measured for the bulk density and the particle diameters ($D_{50}$ and $D_{10}$) in the same manner as in Example 1. Results are presented in Table 2.

Example 13

An anionic flocculant was obtained in the same manner as in Example 2 except that two sieves (one sieve had a sieve aperture of 710 μm and the other sieve had a sieve aperture of 1 mm) were used, and the products remaining on the sieve having the aperture of 710 μm were used.

The obtained anionic flocculant was measured for the bulk density and the particle diameters ($D_{50}$ and $D_{10}$) in the same manner as in Example 1. Results are presented in Table 2.

Comparative Example 1

An anionic flocculant was obtained in the same manner as in Example 2 except that the number of revolutions of the extrusion granulator was changed to 20 rpm.

The obtained anionic flocculant was measured for the bulk density and the particle diameters ($D_{50}$ and $D_{10}$) in the same manner as in Example 1. Results are presented in Table 3.

Comparative Example 2

An anionic flocculant was obtained in the same manner as in Example 2 except that the number of revolutions of the extrusion granulator was changed to 50 rpm.

The obtained anionic flocculant was measured for the bulk density and the particle diameters ($D_{50}$ and $D_{10}$) in the same manner as in Example 1. Results are presented in Table 3.

Comparative Example 3

An anionic flocculant was obtained in the same manner as in Example 2 except that two sieves (one sieve had a sieve aperture of 150 μm and the other sieve had a sieve aperture of 300 μm) were used, and the products remaining on the sieve having the aperture of 150 μm were used.

The obtained anionic flocculant was measured for the bulk density and the particle diameters ($D_{50}$ and $D_{10}$) in the same manner as in Example 1. Results are presented in Table 3.

Comparative Example 4

An anionic flocculant was obtained in the same manner as in Example 2 except that the sieve aperture of the classifier was changed to 1.4 mm.

The obtained anionic flocculant was measured for the bulk density and the particle diameters ($D_{50}$ and $D_{10}$) in the same manner as in Example 1. Results are presented in Table 3.

Comparative Example 5

An anionic flocculant was obtained in the same manner as in Example 2 except that the sieve aperture of the classifier was changed to 355 μm.

The obtained anionic flocculant was measured for the bulk density and the particle diameters ($D_{50}$ and $D_{10}$) in the same manner as in Example 1. Results are presented in Table 3.

Comparative Example 6

A granulated product was obtained in the same manner as in Example 1 except that galactomannan (80 parts by mass) and another polysaccharide (20 parts by mass) were changed to guar gum (100 parts by mass).

The obtained granulated product was measured for the bulk density and the particle diameters ($D_{50}$ and $D_{10}$) in the same manner as in Example 1. Results are presented in Table 4.

Comparative Example 7

A granulated product was obtained in the same manner as in Example 1 except that galactomannan (80 parts by mass) and another polysaccharide (20 parts by mass) were changed to tara gum (100 parts by mass).

The obtained granulated product was measured for the bulk density and the particle diameters ($D_{50}$ and $D_{10}$) in the same manner as in Example 1. Results are presented in Table 4.

Comparative Example 8

A granulated product was obtained in the same manner as in Example 1 except that galactomannan (80 parts by mass) and another polysaccharide (20 parts by mass) were changed to xanthan gum (100 parts by mass).

The obtained granulated product was measured for the bulk density and the particle diameters ($D_{50}$ and $D_{10}$) in the same manner as in Example 1. Results are presented in Table 4.

Comparative Example 9

A granulated product was obtained in the same manner as in Example 1 except that galactomannan (80 parts by mass) and another polysaccharide (20 parts by mass) were changed to carrageenan (100 parts by mass).

The obtained granulated product was measured for the bulk density and the particle diameters ($D_{50}$ and $D_{10}$) in the same manner as in Example 1. Results are presented in Table 4.

Comparative Example 10

A commercially available polyacrylamide flocculant (FLOPAM AN926VHM, available from SNF, acrylic acid/acrylamide copolymer product) was used as a flocculant of Comparative Example 10.

The flocculant was measured for the bulk density and the particle diameters ($D_{50}$ and $D_{10}$) in the same manner as in Example 1. Results are presented in Table 4.

<Viscosity>

Each of the granulated products of Examples 1 to 13 and Comparative Examples 1 to 9 and the flocculant of Comparative Example 10 (0.2 parts by mass each) was dissolved in pure water (100 parts by mass) to obtain an aqueous solution.

The viscosity of the obtained solution was measured for the viscosity at 25° C. using a B-type viscometer (speed of revolution: 30 rpm). Results are presented in Table 1 to Table 4.

<Rate of Increase in Viscosity>

The measured viscosities of the granulated products of Examples 1 to 13 and Comparative Examples 1 to 5 were compared to the viscosity of galactomannan alone or the viscosity of the polysaccharide alone, to determine a rate of increase in viscosity.

The rate of increase in viscosity (%)=100×(the viscosity of a mixture)/(the viscosity of galactomannan alone or polysaccharide alone)

<Evaluation of Flocs>

The anionic flocculant (0.2% by mass) was charged into pure water, followed by stirring at 250 rpm. The state of being dissolved was visually observed.

[Evaluation Criteria]

A: The anionic flocculant was dissolved in 30 minutes.

B: The anionic flocculant was dissolved in more than 30 minutes but 40 minutes or less (small flocs remained at the time when 30 minutes passed).

C: Even after 40 minutes passed, flocs remained.

TABLE 1

|  |  |  |  |  | Example | | | | | | | |
|---|---|---|---|---|---|---|---|---|---|---|---|---|
|  |  |  |  |  | 1 | 2 | 3 | 4 | 5 | 6 | 7 | 8 |
|  |  | No. |  |  | 1 | 2 | 3 | 4 | 5 | 6 | 7 | 8 |
| Anionic flocculant | Granulated product | Galactomannan | Guar gum | Part(s) by mass | 80 | 20 | — | 40 | 40 | — | 98 | 2 |
|  |  |  | Tara gum |  | — | — | 80 | 40 | — | 40 | — | — |
|  |  | Polysaccharide | Xanthan gum |  | 20 | 80 | 20 | 20 | — | — | 2 | 98 |
|  |  |  | Carrageenan |  | — | — | — | — | 60 | 60 | — | — |
|  | Viscosity |  | mPa·s |  | 615 | 312 | 1080 | 703 | 16.0 | 17.1 | 38.2 | 181 |
|  | Rate of increase in viscosity (%) |  | vs. guar gum |  | 5041% | 2557% | — | 5762% | 131% | 140% | 313% | 1484% |
|  |  |  | vs. tara gum |  | — | — | 7826% | 5094% | — | — | — | — |
|  |  |  | vs. polysaccharide |  | 368% | 187% | 647% | 421% | 151% | 161% | 23% | 108% |
|  | Bulk density |  | g/cm³ |  | 0.70 | 0.75 | 0.84 | 0.82 | 0.78 | 0.83 | 0.74 | 0.73 |
|  | Particle diameter ($D_{50}$) |  | μm |  | 585 | 602 | 634 | 570 | 677 | 626 | 482 | 545 |
|  | Particle diameter ($D_{10}$) |  | μm |  | 425 | 458 | 448 | 418 | 523 | 481 | 309 | 415 |
|  | Generation of flocs (presence or absence) |  |  |  | A | A | A | A | A | A | A | A |

TABLE 2

|  |  |  |  |  | Example | | | | |
|---|---|---|---|---|---|---|---|---|---|
|  |  |  |  |  | 9 | 10 | 11 | 12 | 13 |
|  |  | No. |  |  | 9 | 20 | 11 | 12 | 13 |
| Anionic flocculant | Granulated product | Galactomannan | Guar gum | Part(s) by mass | 20 | 20 | 20 | 20 | 20 |
|  |  |  | Tara gum |  | — | — | — | — | — |
|  |  | Polysaccharide | Xanthan gum |  | 80 | 80 | 80 | 80 | 80 |
|  |  |  | Carrageenan |  | — | — | — | — | — |
|  | Viscosity |  | mPa·s |  | 339 | 341 | 301 | 299 | 288 |
|  | Rate of increase in viscosity (%) |  | vs. guar gum |  | 2779% | 2795% | 2467% | 2451% | 2361% |
|  |  |  | vs. tara gum |  | — | — | — | — | — |
|  |  |  | vs. polysaccharide |  | 203% | 204% | 180% | 179% | 172% |
|  | Bulk density |  | g/cm³ |  | 0.60 | 0.87 | 0.72 | 0.85 | 0.70 |
|  | Particle diameter ($D_{50}$) |  | μm |  | 577 | 681 | 331 | 782 | 833 |
|  | Particle diameter ($D_{10}$) |  | μm |  | 422 | 485 | 215 | 585 | 691 |
|  | Generation of flocs (presence or absence) |  |  |  | A | A | A | A | A |

TABLE 3?

|  |  |  |  |  | Comparative Example | | | | |
|---|---|---|---|---|---|---|---|---|---|
|  |  |  |  |  | 1 | 2 | 3 | 4 | 5 |
|  |  | No. |  |  | A1 | A2 | A3 | A4 | A5 |
| Anionic flocculant | Granulated product | Galactomannan | Guar gum | Part(s) by mass | 20 | 20 | 20 | 20 | 20 |
|  |  |  | Tara gum |  | — | — | — | — | — |
|  |  | Polysaccharide | Xanthan gum |  | 80 | 80 | 80 | 80 | 80 |
|  |  |  | Carrageenan |  | — | — | — | — | — |
|  | Viscosity |  | mPa·s |  | 307 | 311 | 310 | 314 | 284 |
|  | Rate of increase in viscosity (%) |  | vs. guar gum |  | 2516% | 2549% | 2541% | 2574% | 2328% |
|  |  |  | vs. tara gum |  | — | — | — | — | — |
|  |  |  | vs. polysaccharide |  | 184% | 186% | 186% | 188% | 170% |
|  | Bulk density |  | g/cm³ |  | 0.45 | 1.08 | 0.57 | 0.84 | 0.53 |
|  | Particle diameter ($D_{50}$) |  | μm |  | 531 | 782 | 238 | 1,120 | 262 |
|  | Particle diameter ($D_{10}$) |  | μm |  | 359 | 586 | 157 | 632 | 88 |
|  | Generation of flocs (presence or absence) |  |  |  | B | B | C | C | B |

TABLE 4

|  |  |  |  |  | Comparative Example | | | | |
|---|---|---|---|---|---|---|---|---|---|
|  |  |  |  |  | 6 | 7 | 8 | 9 | 10 |
|  |  | No. |  |  | A6 | A7 | A8 | A9 | A10 |
| Flocculant | Granulated product | Galactomannan | Guar gum | Part(s) by mass | 100 |  |  |  | Polyacrylamide |
|  |  |  | Tara gum |  |  | 100 |  |  |  |
|  |  | Polysaccharide | Xanthan gum |  |  |  | 100 |  |  |
|  |  |  | Carrageenan |  |  |  |  | 100 |  |
|  | Viscosity |  | mPa·s |  | 12.2 | 13.8 | 167 | 10.6 | 295 |
|  | Bulk density |  | g/cm³ |  | 0.84 | 0.81 | 0.75 | 0.72 | 0.72 |
| Particle diameter ($D_{50}$) |  |  | μm |  | 625 | 578 | 618 | 558 | 573 |
| Particle diameter ($D_{10}$) |  |  | μm |  | 467 | 418 | 443 | 387 | 320 |
| Generation of flocs (presence or absence) |  |  |  |  | A | A | A | A | A |

Details of the polysaccharides used in Table 1 to Table 4 are as follows.
Guar gum: GRINDSTED GUAR 175 (product name), obtained from Danisco
Tara gum: SPINOGUM (product name), obtained from FUSO CHEMICAL CO., LTD.
Xanthan gum: KELZAN (product name), obtained from CP Kelco
Carrageenan: GENUVISCO CSW-2 (product name), obtained from CP Kelco <Water Purification Performance (Flocculation Performance)>

The water purification performance using a flocculant was evaluated in the following manner.

The inorganic flocculant or the cationic flocculant described in Table 5 to Table 9 was added to raw water containing kaolin (10 g/L) (turbidity=10,000 degrees [kaolin], 25° C.) so that an amount of $Al_2O_3$ was 20 mg relative to the raw water (1 L). Then, NaOH was added thereto to adjust the pH to 7.0. Each of the anionic flocculants of Examples 1 to 13 and Comparative Examples 1 to 5 and the flocculants of Comparative Examples 6 to 10 (5 mg each) was added to the resultant relative to the raw water (1 L). Then, the resultant was stirred at 150 rpm for 1 minute and at 40 rpm for 2 minutes, and was left to stand. One minute and ten minutes, (60 minutes) after the standing still, the turbidity of the supernatant was measured. The measurement was performed according to the JIS K 0101:1998 (Testing Methods for Industrial Water 9.2 transmission light turbidity), and a spectrophotometer (available from HACH, DR 3900) was used. An example, in which only the inorganic flocculant was used, and the flocculants of Examples and Comparative Examples were not used, was considered as Reference Example 1. The evaluation was performed in the following evaluation criteria. Results are presented in Table 5 to Table 9.

[Evaluation Criteria]
A: The turbidity obtained after 10 minutes was less than 10 degrees [Kaolin].
B: The turbidity obtained after 10 minutes was 10 degrees [kaolin] or more but less than 50 degrees [kaolin].
C: The turbidity obtained after 10 minutes was 50 degrees [kaolin] or more.

<Flocculation-Coalescence Performance>

The flocculation-coalescence performance was visually evaluated based on the following evaluation criteria.

[Evaluation Criteria]
A: Many precipitated products were found, flocs precipitated to some extent, and the supernatant was less turbid and was nearly transparent.
C: Less precipitated products were found, flocs did not precipitate very much, and the supernatant was highly turbid and was not transparent.

<Percentage of Water Content in Dewatered Sludge>

A heating-drying-type moisture analyzer (obtained from A&D Company, Limited, moisture analyzer MX-50) was used to perform the measurement at a heating temperature of 105° C. The measurement was performed according to the specification of the device.

TABLE 5

|  |  |  |  |  | Example | | | | | | | |
|---|---|---|---|---|---|---|---|---|---|---|---|---|
|  |  |  |  |  | 14 | 15 | 16 | 17 | 18 | 19 | 20 | 21 |
|  |  | No. |  |  | 1 | 2 | 3 | 4 | 5 | 6 | 7 | 8 |
| Anionic flocculant | Granulated product | Galactomannan | Guar gum | Part(s) by mass | 80 | 20 |  | 40 | 40 |  | 98 | 2 |
|  |  |  | Tara gum |  |  |  | 80 | 40 |  | 40 |  |  |
|  |  | Polysaccharide | Xanthan gum |  | 20 | 80 | 20 | 20 |  |  | 2 | 98 |
|  |  |  | Carrageenan |  |  |  |  |  | 60 | 60 |  |  |
|  | Viscosity |  | mPa·s |  | 615 | 312 | 1080 | 703 | 16.0 | 17.1 | 38.2 | 181 |
|  | Rate of increase in viscosity (%) |  | vs. guar gum |  | 5041% | 2557% | — | 5762% | 131% | 140% | 313% | 1484% |
|  |  |  | vs. tara gum |  | — | — | 7826% | 5094% | — | — | — | — |
|  |  |  | vs. polysaccharide |  | 368% | 187% | 647% | 421% | 151% | 161% | 23% | 108% |
|  | Bulk density |  | g/cm³ |  | 0.70 | 0.75 | 0.84 | 0.82 | 0.78 | 0.83 | 0.74 | 0.73 |
| Particle diameter ($D_{50}$) |  |  | μm |  | 585 | 602 | 634 | 570 | 677 | 626 | 482 | 545 |
| Particle diameter ($D_{10}$) |  |  | μm |  | 425 | 458 | 448 | 418 | 523 | 481 | 309 | 415 |
| Generation of flocs (presence or absence) |  |  |  |  | A | A | A | A | A | A | A | A |
| Inorganic flocculant |  |  | PAC |  | Added | Added | Added | Added | Added | Added | Added | Added |
|  |  |  | Polyiron(III) sulfate |  |  |  |  |  |  |  |  |  |
|  |  |  | Polysilica iron |  |  |  |  |  |  |  |  |  |
|  |  |  | Iron(III) chloride |  |  |  |  |  |  |  |  |  |
| Cationic flocculant |  |  | Chitosan |  |  |  |  |  |  |  |  |  |
|  |  |  | Cationized starch |  |  |  |  |  |  |  |  |  |
|  |  |  | Cationized guar gum |  |  |  |  |  |  |  |  |  |

TABLE 5-continued

| | | | Example | | | | | | | |
|---|---|---|---|---|---|---|---|---|---|---|
| | | | 14 | 15 | 16 | 17 | 18 | 19 | 20 | 21 |
| Water purification performance | Turbidity (degree) | After 1 minute | 3.1 | 2.7 | 5.0 | 4.6 | 5.7 | 6.2 | 5.0 | 5.4 |
| | | After 10 minutes | 2.3 | 2.0 | 2.1 | 3.2 | 2.9 | 3.2 | 2.8 | 2.6 |
| | | After 60 minutes | — | | | | | | | |
| | | Evaluation result | A | A | A | A | A | A | A | A |
| | Flocculation · coalescence performance | | A | A | A | A | A | A | A | A |
| | Percentage of water content in dewatered sludge (%) | | 82.5 | 83.2 | 82.3 | 83.5 | 81.9 | 82.4 | 82.8 | 82.9 |

TABLE 6

| | | | | | Example | | | | |
|---|---|---|---|---|---|---|---|---|---|
| | | | | | 22 | 23 | 24 | 25 | 26 |
| | | No. | | | 9 | 10 | 11 | 12 | 13 |
| Anionic flocculant | Granulated product | Galactomannan | Guar gum | Part(s) by mass | 20 | 20 | 20 | 20 | 20 |
| | | | Tara gum | | | | | | |
| | | Polysaccharide | Xanthan gum | | 80 | 80 | 80 | 80 | 80 |
| | | | Carrageenan | | | | | | |
| | | Viscosity | | mPa · s | 339 | 341 | 301 | 299 | 288 |
| | | Rate of increase in viscosity (%) | vs. guar gum | | 2779% | 2795% | 2467% | 2451% | 2361% |
| | | | vs. tara gum | | — | — | — | — | — |
| | | | vs. polysaccharide | | 203% | 204% | 180% | 179% | 172% |
| | | Bulk density | | g/cm³ | 0.60 | 0.87 | 0.72 | 0.85 | 0.7 |
| | | Particle diameter ($D_{50}$) | | μm | 577 | 681 | 331 | 782 | 833 |
| | | Particle diameter ($D_{10}$) | | μm | 422 | 485 | 215 | 585 | 691 |
| | | Generation of flocs (presence or absence) | | | A | A | A | A | A |
| Inorganic flocculant | | PAC | | | Added | Added | Added | Added | Added |
| | | Polyiron(III) sulfate | | | | | | | |
| | | Polysilica iron | | | | | | | |
| | | Iron(III) chloride | | | | | | | |
| Cationic flocculant | | Chitosan | | | | | | | |
| | | Cationized starch | | | | | | | |
| | | Cationized guar gum | | | | | | | |
| Water purification performance | Turbidity (degree) | After 1 minute | | | 3.0 | 3.2 | 3.1 | 2.8 | 3.1 |
| | | After 10 minutes | | | 2.2 | 2.1 | 2.3 | 2.1 | 2.1 |
| | | After 60 minutes | | | — | — | — | — | — |
| | | Evaluation result | | | A | A | A | A | A |
| | Flocculation · coalescence performance | | | | A | A | A | A | A |
| | Percentage of water content in dewatered sludge (%) | | | | 82.5 | 81.8 | 82.4 | 82.1 | 81.7 |

TABLE 7

| | | | | | Example | | | | | |
|---|---|---|---|---|---|---|---|---|---|---|
| | | | | | 27 | 28 | 29 | 30 | 31 | 32 |
| | | No. | | | 2 | 2 | 2 | 2 | 2 | 2 |
| Anionic flocculant | Granulated product | Galactomannan | Guar gum | Part(s) by mass | 20 | 20 | 20 | 20 | 20 | 20 |
| | | | Tara gum | | | | | | | |
| | | Polysaccharide | Xanthan gum | | 80 | 80 | 80 | 80 | 80 | 80 |
| | | | Carrageenan | | | | | | | |
| | | Viscosity | | mPa · s | 312 | 312 | 312 | 312 | 312 | 312 |
| | | Rate of increase in viscosity (%) | vs. guar gum | | 2557% | 2557% | 2557% | 2557% | 2557% | 2557% |
| | | | vs. tara gum | | — | — | — | — | — | — |
| | | | vs. polysaccharide | | 187% | 187% | 187% | 187% | 187% | 187% |
| | | Bulk density | | g/cm³ | 0.75 | 0.75 | 0.75 | 0.75 | 0.75 | 0.75 |
| | | Particle diameter ($D_{50}$) | | μm | 602 | 602 | 602 | 602 | 602 | 602 |
| | | Particle diameter ($D_{10}$) | | μm | 458 | 458 | 458 | 458 | 458 | 458 |
| | | Generation of flocs (presence or absence) | | | A | A | A | A | A | A |
| Inorganic flocculant | | PAC | | | Added | | | | | |
| | | Polyiron(III) sulfate | | | | Added | | | | |
| | | Polysilica iron | | | | | Added | | | |
| | | Iron(III) chloride | | | | | | Added | | |
| Cationic flocculant | | Chitosan | | | | | | | Added | |
| | | Cationized starch | | | | | | | Added | |
| | | Cationized guar gum | | | | | | | | Added |

TABLE 7-continued

|  |  |  | Example | | | | | |
|---|---|---|---|---|---|---|---|---|
|  |  |  | 27 | 28 | 29 | 30 | 31 | 32 |
| Water purification performance | Turbidity (degree) | After 1 minute | 6.1 | 4.3 | 6.7 | 5.8 | 17.3 | 16.32 |
|  |  | After 10 minutes | 4.2 | 3.2 | 4.5 | 3.6 | 8.2 | 9.9 |
|  |  | After 60 minutes | — | — | — | — | — | — |
|  |  | Evaluation result | A | A | A | A | A | B |
|  | Flocculation · coalescence performance | | A | A | A | A | A | A |
| Percentage of water content in dewatered sludge (%) | | | 80.3 | 80.3 | 78.7 | 81.9 | 84.1 | 82.7 |

TABLE 8

|  |  |  |  |  | Comparative Example | | | | |
|---|---|---|---|---|---|---|---|---|---|
|  |  |  |  |  | 11 | 12 | 13 | 14 | 15 |
|  |  | No. |  |  | A1 | A2 | A3 | A4 | A5 |
| Anionic flocculant | Granulated product | Galactomannan | Guar gum | Part(s) by mass | 20 | 20 | 20 | 20 | 20 |
|  |  |  | Tara gum |  |  |  |  |  |  |
|  |  | Polysaccharide | Xanthan gum |  | 80 | 80 | 80 | 80 | 80 |
|  |  |  | Carrageenan |  |  |  |  |  |  |
|  |  | Viscosity |  | mPa · s | 307 | 311 | 310 | 314 | 284 |
|  |  | Rate of increase in viscosity (%) | vs. guar gum |  | 2516% | 2549% | 2541% | 2574% | 2328% |
|  |  |  | vs. tara gum |  | — | — | — | — | — |
|  |  |  | vs. polysaccharide |  | 184% | 186% | 186% | 188% | 170% |
|  |  | Bulk density |  | g/cm³ | 0.45 | 1.08 | 0.57 | 0.84 | 0.53 |
|  |  | Particle diameter ($D_{50}$) |  | μm | 531 | 782 | 238 | 1,120 | 262 |
|  |  | Particle diameter ($D_{10}$) |  | μm | 359 | 586 | 157 | 632 | 88 |
|  |  | Generation of flocs (presence or absence) |  |  | B | B | C | C | B |
| Inorganic flocculant |  |  | PAC |  | Added | Added | Added | Added | Added |
|  |  |  | Polyiron(III) sulfate |  |  |  |  |  |  |
|  |  |  | Polysilica iron |  |  |  |  |  |  |
|  |  |  | Iron(III) chloride |  |  |  |  |  |  |
| Cationic flocculant |  |  | Chitosan |  |  |  |  |  |  |
|  |  |  | Cationized starch |  |  |  |  |  |  |
|  |  |  | Cationized guar gum |  |  |  |  |  |  |
| Water purification performance | Turbidity (degree) | After 1 minute |  |  | 3.3 | 3.1 | 4.0 | 3.1 | 3.4 |
|  |  | After 10 minutes |  |  | 2.1 | 2.3 | 2.9 | 2.7 | 2.9 |
|  |  | After 60 minutes |  |  | — | — | — | — | — |
|  |  | Evaluation result |  |  | A | A | A | A | A |
|  | Flocculation · coalescence performance |  |  |  | A | A | A | A | A |
| Percentage of water content in dewatered sludge (%) |  |  |  |  | 83.2 | 82.4 | 83.0 | 82.7 | 82.3 |

TABLE 9

|  |  |  |  |  | Comparative Example | | | | | Reference Example |
|---|---|---|---|---|---|---|---|---|---|---|
|  |  |  |  |  | 16 | 17 | 18 | 19 | 20 | 1 |
|  |  | No. |  |  | A5 | A6 | A7 | A8 | A9 | — |
| Flocculant | Granulated product | Galactomannan | Guar gum | Part(s) by mass | 100 |  |  |  | Polyacrylamide |  |
|  |  |  | Tara gum |  |  | 100 |  |  |  |  |
|  |  | Polysaccharide | Xanthan gum |  |  |  | 100 |  |  |  |
|  |  |  | Carrageenan |  |  |  |  | 100 |  |  |
|  |  | Viscosity |  | mPa · s | 12.2 | 13.8 | 167 | 10.6 | 295 |  |
|  |  | Bulk density |  | g/cm³ | 0.84 | 0.81 | 0.75 | 0.72 | 0.72 |  |
|  |  | Particle diameter ($D_{50}$) |  | μm | 625 | 578 | 610 | 552 | 573 |  |
|  |  | Particle diameter ($D_{10}$) |  | μm | 467 | 418 | 523 | 481 | 320 |  |
|  |  | Generation of flocs (presence or absence) |  |  | A | A | A | A | A |  |
| Inorganic flocculant |  |  | PAC |  | Added | Added | Added | Added | Added | Added |
|  |  |  | Polyiron(III) sulfate |  |  |  |  |  |  |  |
|  |  |  | Polysilica iron |  |  |  |  |  |  |  |
|  |  |  | Iron(III) chloride |  |  |  |  |  |  |  |
| Cationic flocculant |  |  | Chitosan |  |  |  |  |  |  |  |
|  |  |  | Cationized starch |  |  |  |  |  |  |  |
|  |  |  | Cationized guar gum |  |  |  |  |  |  |  |
| Water purification performance | Turbidity (degree) | After 1 minute |  |  | 6.5 | 7.8 | 7.4 | 188 | 28.2 | 507 |
|  |  | After 10 minutes |  |  | 4.2 | 3.4 | 6.6 | 70 | 13.9 | 55.6 |
|  |  | After 60 minutes |  |  | — | — | — | 26.6 | — | 14.2 |

TABLE 9-continued

|  | Comparative Example | | | | | Reference Example |
|---|---|---|---|---|---|---|
|  | 16 | 17 | 18 | 19 | 20 | 1 |
| Evaluation result | A | A | A | C | B | C |
| Flocculation · coalescence performance | A | A | A | C | A | C |
| Percentage of water content in dewatered sludge (%) | 82.7 | 83.1 | 82.2 | 90.8 | 85.0 | 90.3 |

From the results of Examples 1 to 13 and Comparative Examples 1 to 5, an anionic flocculant including galactomannan and a polysaccharide other than the galactomannan successfully prevented generation of flocs and was easily handled because such an anionic flocculant had a bulk density of 0.50 g/cm³ or more but 1.00 g/cm³ or less, a particle diameter $D_{50}$ of 250 µm or more but 850 µm or less, and a particle diameter $D_{10}$ of 150 µm or more.

In comparison between Examples 14 to 26 and Comparative Examples 16 to 19, an anionic flocculant including galactomannan and a polysaccharide other than the galactomannan had a lower turbidity obtained after 10 minutes and was more excellent in the water purification performance than an anionic flocculant including a polysaccharide alone.

Note that, there were some cases where the water purification performances of Examples 27 to 32 were lower than the water purification performances of Comparative Examples 16 to 19. The reason for this is because the kind of inorganic flocculant or cationic flocculant was different. For example, comparison between Example 14 and Comparative Examples 16 to 19 using the same inorganic flocculant exhibited that Example 14 was more excellent in the water purification performance than Comparative Examples 16 to 19.

Polyaluminum chloride (PAC): PAC250A (product name), available from Taki Chemical Co., Ltd.

Polyiron(III) sulfate: POLYTETSU (product name), available from Nittetsu Mining Co., Ltd.

Polysilica iron: PSI-025 (product name), available from Otsuki Rikagaku

Iron(III) chloride: Iron(III) chloride-hexahydrate: available from FUJIFILM Wako Pure Chemical Corporation Chitosan: KOYO chitosan SK-10 (product name), available from KOYO CHEMICAL CO., LTD.

Cationized starch: M-350B (product name), available from Showa Sangyo Co., Ltd.

Cationized guar gum: Labol gum CG-M (product name), available from DSP GOKYO FOOD & CHEMICAL CO., LTD.

INDUSTRIAL APPLICABILITY

The anionic flocculant of the present invention is excellent in the flocculation performance even when it does not include a polyacrylamide-based flocculant. Therefore, the anionic flocculant of the present invention can be suitably applied to, for example, drainage water treatments utilizing a nonionic or anionic polymer flocculant (e.g., treatments of drainage water from plants, where the drainage water includes, as contaminant substances, fluorine, suspended solids (SS), heavy metals, cyanogen, and phosphorus), water purification treatments, and thickening of sludge.

The invention claimed is:

1. An anionic flocculant comprising:
   galactomannan; and
   a polysaccharide other than the galactomannan,
   wherein the anionic flocculant has a bulk density of 0.50 g/cm³ or more but 1.00 g/cm³ or less,
   the anionic flocculant has a particle diameter $D_{50}$ of 250 µm or more but 850 µm or less,
   the anionic flocculant has a particle diameter $D_{10}$ of 150 µm or more, and
   wherein a difference ($D_{50}$–$D_{10}$) between the particle diameter $D_{50}$ and the particle diameter $D_{10}$ is 50 µm or more and 300 µm or less.

2. The anionic flocculant according to claim 1, wherein the galactomannan is derived from a natural product, and
   the polysaccharide is derived from a natural product.

3. The anionic flocculant according to claim 1, wherein the galactomannan includes at least one selected from the group consisting of fenugreek gum, guar gum, tara gum, and locust bean gum.

4. The anionic flocculant according to claim 1, wherein the polysaccharide includes at least one selected from the group consisting of xanthan gum, carrageenan, and carboxymethyl cellulose.

5. The anionic flocculant according to claim 1, wherein a mass ratio (galactomannan:polysaccharide) between the galactomannan and the polysaccharide is from 0.1:99.9 through 99.9:0.1.

6. The anionic flocculant according to claim 1, wherein an aqueous solution obtained by dissolving 0.2 parts by mass of the anionic flocculant in 100 parts by mass of pure water has a viscosity of 10 mPa·s or more.

7. The anionic flocculant according to claim 1, wherein a viscosity of an aqueous solution obtained by dissolving 0.2 parts by mass of the anionic flocculant in 100 parts by mass of pure water is higher than a viscosity of an aqueous solution obtained by dissolving 0.2 parts by mass of the galactomannan in 100 parts by mass of pure water and a viscosity of an aqueous solution obtained by dissolving 0.2 parts by mass of the polysaccharide in 100 parts by mass of pure water.

8. The anionic flocculant according to claim 1, wherein the anionic flocculant is a water purification agent.

9. The anionic flocculant according to claim 1, wherein the anionic flocculant is a thickener of sludge.

10. A method for producing the anionic flocculant according to claim 1, the method comprising:
    kneading the galactomannan, the polysaccharide, and water, to obtain a kneaded product;
    subjecting the kneaded product to extrusion granulation or agitation granulation to perform granulation, to obtain a granulated product;

drying the granulated product to obtain a dried product;
disintegrating the dried product to obtain a disintegrated product; and
classifying the disintegrated product.

11. A treatment method comprising:
adding the anionic flocculant according to claim 1 to a treatment target matter, to treat the treatment target matter.

12. The treatment method according to claim 11, further comprising:
adding, to the treatment target matter, at least one selected from the group consisting of an inorganic flocculant and a cationic flocculant.

13. The treatment method according to claim 12,
wherein the inorganic flocculant includes at least one selected from the group consisting of iron (II) chloride, iron (III) chloride, iron (II) sulfate, iron (III) sulfate, polyiron (III) sulfate, polysilica iron, iron (II) nitrate, iron (III) nitrate, and slaked lime.

14. The treatment method according to claim 12,
wherein the cationic flocculant includes at least one selected from the group consisting of chitosan, oligo glucosamine, cationized starch, cationized cellulose, and cationized guar gum.

15. The treatment method according to claim 11,
wherein the treatment target matter is drainage water to be cleaned in a filtration pool for a water purification treatment; sludge; or treatment target water including drainage water from plants.

* * * * *